Oct. 24, 1961 — A. A. HIRSCH — 3,005,333
ATTACHABLE CHANGE GEAR FINDING SCALE FOR WATER METER TESTING
Filed May 13, 1957
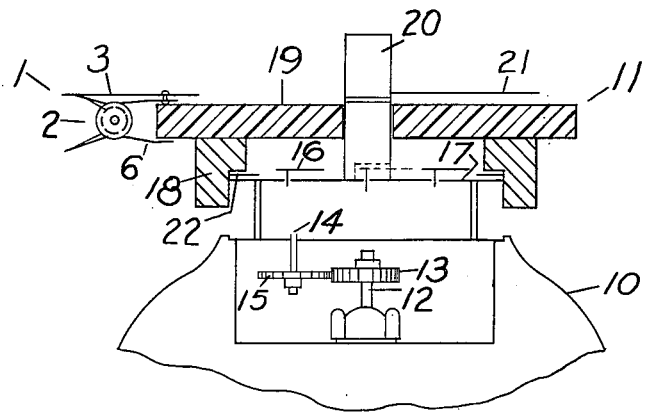
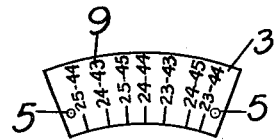
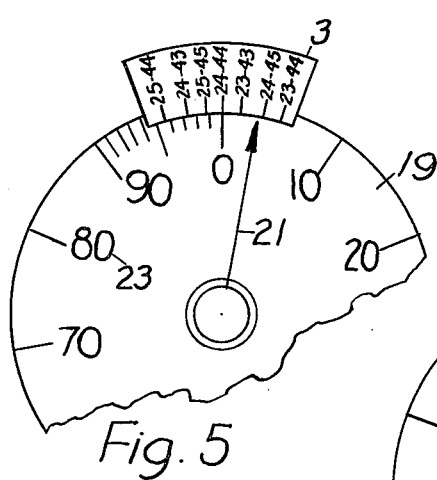
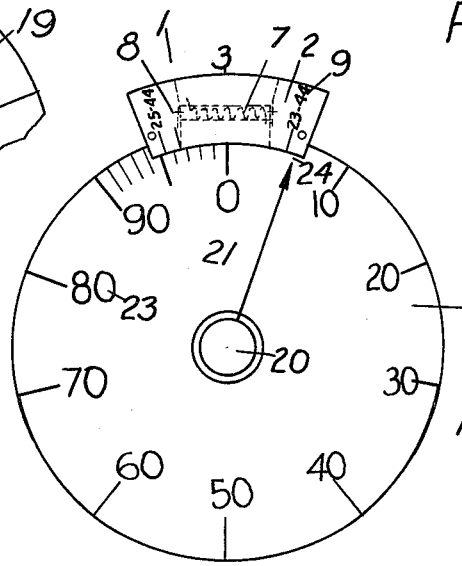
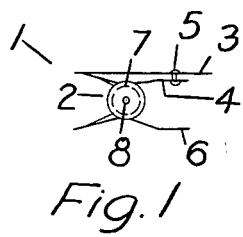
a. Adler Hirsch
INVENTOR.

United States Patent Office
3,005,333
Patented Oct. 24, 1961

3,005,333
ATTACHABLE CHANGE GEAR FINDING SCALE FOR WATER METER TESTING
Abraham Adler Hirsch, 302 Dazell St., Shreveport, La.
Filed May 13, 1957, Ser. No. 658,825
2 Claims. (Cl. 73—3)

Accuracy of water meters and similar devices is determined by running through them a known volume of liquid for comparison with the register readings. If the registration is reasonably close to being correct, a final adjustment is made by selecting the proper gearing between the upshaft of the meter body and the register. This particular set of gear wheels, known as change gears, consists of a driving gear attached removably to the stuffing box shaft on top of the meter body, and a driven gear removably attached to the main shaft of the register. These gear wheels are termed stuffing box gear and register gear, respectively. One of the main objects in testing meters whether new, removed from service, or following repairs is to enable correct selection of the change gear pair to hold the accuracy of registration within the limits as required by regulatory bodies, or as recommended by the standards of the American Water Works Association, or as followed as a matter of local policy.

After running a known volume of water through a meter on a test bench, or by equivalent check, the percent registration is noted. The number of teeth in the two change gears on the meter are already known. If the difference from 100% registration exceeds 1½%, a new set of change gears is indicated. The particular set to be substituted can be ascertained by direct calculation involving gear ratios, by reference to tables, or by means of special slide rules. In any case a separate and distinct step is required to utilize the test results for finding the needed gearing.

The object of my invention is to provide simultaneously and as an integral part of the testing operation a simple means to determine directly the correct set of change gears to use.

A further object is to accomplish this result without interfering or complicating the normal testing procedure, and to provide this facility in a manner applicable to multiple unit test benches as well as to single meters.

In order to read the position of the lowest denomination register hand closely on test, an auxiliary dial, known as a test dial, having a longer radius pointer than those on the meter dial face is generally mounted over the register. Meters provided with a so-called sweep hand ordinarily do not require a test dial to be applied during testing, however, a test dial may be mounted on such registers with equal facility when desired. The face of the test dial is a circle divided into percentages of its circumference. Usually a volume of water is drawn through the meter sufficient to cause a full revolution of the test dial hand. If the meter reads incorrectly, the error is shown by the difference between the actual percent of registration and 100%.

A further object of my invention is to furnish an auxiliary scale removably and slidably attached to the test dial, so scaled off as to enable an operator to read off immediately the proper change gears needed for adjusting the percent registration as closely as possible to 100%, without the necessity of using charts, tables or calculations.

The construction and method of attachment of the auxiliary gear finding scale to a test register dial for water meters is shown in the accompanying drawings in which FIGURE 1 is an elevational cross section of the auxiliary gear finding scale assembly, FIGURE 2 is a typical view of the face of an auxiliary gear finding scale, FIGURE 3 is an elevation and cross section showing the auxiliary scale applied to a test dial placed on top of a water meter register, FIGURE 4 is a plan view of a test register dial face with an auxiliary gear selector scale assembly mounted thereon, and FIGURE 5 is another plan view of a gear finder scale mounted on a test register dial to illustrate the method of use.

Identification numerals have fixed significance throughout all drawings.

Referring to FIGURE 1, the auxiliary gear finding scale assembly 1 is essentially a spring actuated pincer clamp 2 to the top of which is attached a segmental plate 3 providing the gear finding enumerations. Plate 3 is attached to the upper jaw 4 of the clamp by means of a pair of rivets or eyelets 5. Upper jaw 4 and lower jaw 6 are actuated by a torsional spring 7. Hinge pin 8 holds the two jaws together.

FIGURE 2 shows an example of the division and enumeration of segment 3. Each pair of numerals 9 indicate various change gear combinations available for a given meter. The numbers selected here for illustration refer to a certain well known make of meter. The outline of segment 3 and clamp jaws 4 and 6 conform to the curvature of a test register disc so as to fit firmly thereon.

Sectional drawing, FIGURE 3, illustrates the relation between the meter 10, the test register dial assembly 11 and the auxiliary gear finding scale 1. Rotation of the stuffing box upshaft 12, operated by the driving mechanism within the meter 10, of no subjective concern to the purpose at hand, is transmitted by a stuffing box gear wheel 13 to the register main drive shaft 14 by means of register gear 15. The pair 13 and 15 are termed change gears as they are made in various combinations to provide a flexible adjustment for inaccuracies in registration. Hands 16 on the register dial face 17 indicate the meter reading.

The test register dial assembly 11 here illustrated consists of a base 18 which rests on the register dial plate 17, a graduated test register disc 19 of fairly thick plastic attached to base 18, a test dial hub 20 the lower end of which straddles the lowest denomination register hand and a test pointer 21 which travels above the calibrations of the test register dial. A friction grip gasket 22 is inserted between the test register base and the register dial plate. The test register dial circle is graduated into 100 divisions, being marked off in tens, 23, except for the 90 to 100 interval wherein the spacing is in units.

The auxiliary gear finding scale assembly 1, the enumerated segment 3 of which is calibrated according to ratios of reduction between various available stuffing box and register gears, grips the edge of the test register disk 19 by means of pincer clamps 2. A slight clearance is allowed between travel of the tip of the test register pointer 21 and the inside edge of the gear finding scale.

In FIGURE 4 a plan view is shown of the test register dial 19 and the auxiliary gear finding scale 3 of FIGURE 3 in working position. The gear finding segment 3 is held to the test register dial in the vicinity of the zero of the dial by means of pincer clamp 2. Clearance 24 is shown between pointer 21 and the inner edge of gear finding segment 3.

FIGURE 5 is a top view as in FIGURE 4 but with structural detail eliminated so as to illustrate the theory and method of use of this device.

The theory and method of use of this device can best be explained by reference to FIGURE 5. The test dial face is divided decimally and numbered every tenth of arc from 0 to 90. Divisions between 90% and 110%, for when the pointer overtravels the central zero, are usually marked off in smaller spaces corresponding to 1% or even ½% of full scale registration. After being previously set at zero, transit of the test hand 21 completely around the circle back to zero indicates perfect registration, when drawing lowest dial volume of water. Any deviation from 100% registration is represented by the distance between the test register hand on completion of the test and 100%.

The gear finding scale 3 is graduated according to the logarithms of the reduction ratios of the various pairs of change gears available for a particular make or model of meter and various volumetric units of registration. However, the test register scale 23 is arithmetically divided although logarithmic division is the theoretically correct method. This simplification is tenable on account of the practically constant ratio between the quantities (100—percent registration) and (1.00—mantissa of logarithm of registration) for numbers deviating not exceeding 10% from 100% registration. This is well within the requisite limit of accuracy provided by the stepwise change gear sets. By retaining an arithmetic scale on the test dial, percent accuracy of registration may be read as heretofore. The gear finding scale and the test register scale thus constitute a functional slide rule.

The method of use is as follows: A gear finding scale drawn for the particular meter under test is attached as shown to the test register dial. The graduation on the gear finding scale corresponding to the prevailing change gears in use is brought opposite the 100% registration mark. The test hand is then properly zeroed according to currently observed, well known precautions.

The usual quantity of water, 10 gallons or 1 cubic foot, in the case of the usual ⅝" domestic service meter, is run through, and the position of the test hand noted with respect to percent registration, for purpose of record only, and with respect to the gear finding scale on which its reading indicates directly the proper set of change gears to select for a 100% accurate reading.

For example, in FIGURE 5, the gear finding scale had been turned so that the currently used change gear marking 24—44 is opposite zero of the test dial. The test hand after drawing 10 gallons of water reads 104.5% registration, or 4.5% over-registry. The correct gears for this meter is shown by pointer 21 to be closest to the 24—45 combination.

Whenever the test hand falls between divisions of the gear finding scale the closest division is chosen as the indicated set, as such a pair of change gears will correct the meter as closely as possible to 100% registry. If however for public relations reasons company policy holds that any degree of over-registration is undesirable, the reading on the gear finder scale next to be reached by the test hand is selected. In this way under-registration will be limited to 1½%, as recommended by specifications of the American Water Works Association without possibility of over-registration.

As previously noted, a separately divided gear finding scale will be required according to make, model, size and volumetric unit of registration of various meters.

Other obvious methods of attachment of the gear finding scale to a test register dial will be apparent and are held to come under the scope of this application.

I claim the following as new:

1. The combination in a liquid meter undergoing test for accuracy of registration, a set of change gears therein, a register with a dial and pointer thereon, said pointer being rotated in response to revolutions of said change gears, a test register resting on the casing of said liquid meter, a pointer on the dial face of said test register mounted radially on a shaft passing through said dial face and keyed on its bottom for insertion on the register dial pointer so as to be driven thereby and an auxiliary scale appropriately graduated in terms of change gear combinations and removably clamped to the periphery of said test register dial face, said scale being marked on a short segmental plate concentric with said test register dial face, the inside arc of said segmental plate overlapping the edge of said test register dial plate so that said test register pointer sweeps by the edge of said gear finding scale, readings for the purpose of change gear selection for said liquid meter being made according to the position of said test register pointer with reference to said auxiliary scale, said segmental plate being attached to the arc-shaped jaws of a hinged clamp which grips the periphery of said test register dial by means of spring pressure, said jaws being so formed as to limit the width of the overlap of said auxiliary scale on said test register dial thereby preventing interference with the revolution of said test register pointer.

2. For fluid meters employing change gears to transmit motion ultimately to drive a pointer over the registration dial thereof a method for selecting change gear combinations to obtain the proper accuracy of registration comprising the several steps of connecting said meter to discharge fluid into an accurately calibrated receiving tank, mounting a test register assembly comprising a dial and pointer on said meter, said test pointer being driven by the inducting mechanism of said meter attaching to said test register dial an auxiliary gear finding scale having graduations corresponding to available sets of change gears, positioning the graduation corresponding to the change gears currently in the meter in line with the zero of the test register dial, aligning the test register pointer also therewith, passing a quantity of fluid represented by a single complete revolution of the register pointer about the dial through the meter into said receiving tank, and noting the final position of the test register pointer on the direct reading gear finding scale, the reading thereon indicating the proper set of change gears for accurate registration of the meter being tested.

References Cited in the file of this patent

UNITED STATES PATENTS

| | | |
|---|---|---|
| 43,036 | Martin | June 7, 1864 |
| 1,992,344 | Bagge | Aug. 15, 1933 |
| 2,316,492 | Trager | Apr. 13, 1943 |
| 2,375,878 | Willens | May 15, 1945 |
| 2,510,327 | Bennett | June 6, 1950 |
| 2,538,528 | Kohlhagen | Jan. 16, 1951 |